United States Patent
Wang et al.

(10) Patent No.: US 7,930,952 B2
(45) Date of Patent: Apr. 26, 2011

(54) TOGGLE-TYPE POSITIONING PLATFORM AND TOGGLE-TYPE MACHINE TOOL

(75) Inventors: Shih-Ming Wang, Taipei (TW); Chih-Peng Yang, Taipei County (TW)

(73) Assignee: Chung Yuan Christian University, Chung-Li (TW)

( * ) Notice: Subject to any disclaimer, the term of this patent is extended or adjusted under 35 U.S.C. 154(b) by 1273 days.

(21) Appl. No.: 11/309,609

(22) Filed: Aug. 31, 2006

(65) Prior Publication Data
US 2007/0295138 A1 Dec. 27, 2007

(30) Foreign Application Priority Data
May 18, 2006 (TW) ................................ 95117612 A

(51) Int. Cl.
*G05G 11/00* (2006.01)
(52) U.S. Cl. ............... 74/490.09; 74/490.07; 74/490.08; 108/20; 108/143
(58) Field of Classification Search ............... 74/490.03, 74/490.07, 490.08, 490.09, 813 R, 490.13; 108/20, 143, 21, 22, 138; 269/60
See application file for complete search history.

(56) References Cited

U.S. PATENT DOCUMENTS

| | | | | |
|---|---|---|---|---|
| 4,972,574 A | * | 11/1990 | Isono et al. | 29/740 |
| 5,311,790 A | * | 5/1994 | Yanagisawa | 74/490.09 |
| 5,378,282 A | * | 1/1995 | Pollard | 118/697 |
| 5,477,743 A | * | 12/1995 | Yanagisawa | 74/490.09 |
| 5,481,936 A | * | 1/1996 | Yanagisawa | 74/490.08 |
| 5,903,125 A | * | 5/1999 | Prentice et al. | 318/625 |
| 6,327,929 B1 | * | 12/2001 | Yanagisawa | 74/490.09 |
| 6,328,510 B1 | * | 12/2001 | Hanrath et al. | 409/235 |
| 6,347,458 B1 | * | 2/2002 | Kaczynski | 33/503 |
| 6,681,703 B2 | * | 1/2004 | Wells et al. | 108/20 |
| 7,100,515 B2 | * | 9/2006 | Helm et al. | 108/20 |
| 7,152,331 B2 | * | 12/2006 | Nakamura et al. | 33/1 M |
| 7,707,907 B2 | * | 5/2010 | Bonev | 74/490.08 |

* cited by examiner

*Primary Examiner* — Richard W Ridley
*Assistant Examiner* — Matthew A Johnson
(74) *Attorney, Agent, or Firm* — Jianq Chyun IP Office

(57) ABSTRACT

A toggle-type positioning platform including a first platform, a motor, a screw rod, a second platform and a linkage is provided. The motor and the screw rod are disposed on the first platform; the motor is coupled to the screw rod and suitable for driving the screw rod to rotate. The second platform is above the first platform and is suitable for moving back and forth alternately along a predetermined path, wherein an included angle exists between an extended direction of the predetermined path and the screw rod. The linkage is disposed between the first platform and the second platform, and is connected between the second platform and the screw rod. The linkage is driven by the rotation of the screw rod, to drive the second platform to move along he predetermined path. Accordingly, the positioning precision of the toggle-type positioning platform is enhanced.

12 Claims, 6 Drawing Sheets unit：μm

| length of the linkage L | displacement of the screw X | Distance H | positioning precision ΔH |
|---|---|---|---|
| 100000 | 2 | 99999.99998 | 2.5E-05 |
| 100000 | 3 | 99999.99996 | 3.5E-05 |
| 100000 | 4 | 99999.99992 | 4.5E-05 |
| 100000 | 5 | 99999.99988 | 5.5E-05 |
| 100000 | 6 | 99999.99982 | 6.5E-05 |
| 100000 | 7 | 99999.99976 | 7.5E-05 |
| 100000 | 8 | 99999.99968 | 8.5E-05 |
| 100000 | 9 | 99999.9996 | 9.5E-05 |
| 100000 | 10 | 99999.9995 | 0.000105 |
| 100000 | 11 | 99999.9994 | 0.000115 |
| 100000 | 12 | 99999.99928 | 0.000125 |
| 100000 | 13 | 99999.99916 | 0.000135 |
| 100000 | 14 | 99999.99902 | 0.000145 |
| 100000 | 15 | 99999.99888 | 0.000155 |
| 100000 | 16 | 99999.99872 | 0.000165 |
| 100000 | 17 | 99999.99856 | 0.000175 |
| 100000 | 18 | 99999.99838 | 0.000185 |
| 100000 | 19 | 99999.9982 | 0.000195 |
| 100000 | 20 | 99999.998 | - |

FIG.3 unit : μm

| length of the linkage L | displacement of the screw X | Distance H | positioning precision ΔH |
|---|---|---|---|
| 100000 | 20 | 99999.998 | 0.0025 |
| 100000 | 30 | 99999.9955 | 0.0035 |
| 100000 | 40 | 99999.992 | 0.0045 |
| 100000 | 50 | 99999.9875 | 0.0055 |
| 100000 | 60 | 99999.982 | 0.0065 |
| 100000 | 70 | 99999.9755 | 0.0075 |
| 100000 | 80 | 99999.968 | 0.0085 |
| 100000 | 90 | 99999.9595 | 0.0095 |
| 100000 | 100 | 99999.95 | 0.0105 |
| 100000 | 110 | 99999.9395 | 0.0115 |
| 100000 | 120 | 99999.928 | 0.0125 |
| 100000 | 130 | 99999.9155 | 0.0135 |
| 100000 | 140 | 99999.902 | 0.0145 |
| 100000 | 150 | 99999.8875 | 0.0155 |
| 100000 | 160 | 99999.872 | 0.0165 |
| 100000 | 170 | 99999.8555 | 0.0175 |
| 100000 | 180 | 99999.838 | 0.0185 |
| 100000 | 190 | 99999.8195 | 0.0195 |
| 100000 | 200 | 99999.8 | - |

FIG.4

TOGGLE-TYPE POSITIONING PLATFORM AND TOGGLE-TYPE MACHINE TOOL

CROSS-REFERENCE TO RELATED APPLICATION

This application claims the priority benefit of Taiwan application serial no. 95117612, filed on May 18, 2006. All disclosure of the Taiwan application is incorporated herein by reference.

BACKGROUND OF THE INVENTION

1. Field of the Invention

The present invention generally relates to a positioning platform and a machine tool, and more particularly, to a toggle-type positioning platform and a toggle-type machine tool.

2. Description of Related Art

With recent advancement in technology, current industry products have developed to be more miniaturized. Accordingly, the micro/meso-scale manufacturing technology is the key point in the oncoming fabrication technology. The micro/meso-scale manufacturing technology may be applied to products of national defence, aviation, electronics, optics, communications, medical treatment and so on. Particularly, it may be applied to the fabrication of micro optical components of high-speed signal transmission, cars, micro-actuators and micro-sensors in medical use, micro-nozzles of high-temperature jet engines, micro fuel cells, micro holes of optical fibers, photolithography technology and so on.

In applications in industry, precise machining is based on high precision positioning technology. Therefore, how to enhance precise positioning is an important index in promotion of industry. The difficulties of the precise positioning technology resulted from too many uncertain factors. Generally, the factors, which are not concerned in large-scale positioning, should be concerned in micro/nano scale positioning.

The wet etching, plasma etching, LIGA process, electron beam, ion beams and so on are used in micro-scaled fabrication process, thus resulting in the development of micro-electro mechanical system (MEMS). Generally speaking, MEMS technology is applied in the fabrication of 2~2.5D geometry, and the relative precision of fabrication is limited to $10^{-1} \sim 10^{-2}$ millimeter. However, for many 3-D miniaturized products having requirements of higher precision and complex shape, the MEMS technology is not able to meet the requirements. Besides, another bottleneck of the MEMS technology is that it can not be applied to metallic material or other diversified materials. Further, scanning tunneling microscope (STM) or atomic force microscope need to be used in nano-scaled fabrication, but the operation speed is lower and the technique is not mature.

Currently, machine tools of multi-axles are serial connected mechanism. This serial connected mechanism, which is similar to cantilever beams, has a larger working area, but it may deform or have displacement due to external loading or its weight. Therefore, only the conventional servo system of serial connected mechanism of higher precision may achieve the precision of sub-micron or even nano-meter scaled. However, the requirements of the related control technique are very strict, and the cost of the whole equipment is effectively increased. Besides, machines features the piezoelectric actuators also have the problems of smaller stroke and hysteresis.

SUMMARY OF THE INVENTION

To achieve the above and other objects, the present invention is directed to a toggle-type positioning platform to provide higher precision.

The present invention is also directed to a toggle-type machine tool to provide higher fabrication precision.

As embodied and broadly described herein, the present invention provides a toggle-type positioning platform comprising a first platform, a motor, a screw rod, a second platform and a linkage. The motor is disposed on the first platform. The screw rod is disposed on the first platform and coupled to the motor, and the motor is suitable for driving the screw rod to rotate. The second platform is disposed on the first platform, wherein the second platform is suitable for moving back and forth alternately along a predetermined path, and an included angle exists between an extended direction of the predetermined path and the screw rod. The linkage is disposed between the first platform and the second platform, and connected between the second platform and the screw rod. The linkage is driven by the rotation of the screw rod, such that the second platform is driven to move along the predetermined path.

According to an embodiment of the present invention, the included angle is 90°.

According to an embodiment of the present invention, the first platform has a guiding groove, and the second platform is suitable for moving along the guiding groove.

According to an embodiment of the present invention, the toggle-type positioning platform further comprises a ball bearing disposed on the second platform. The ball bearing is disposed between the first platform and the second platform, and is suitable for moving along the guiding groove.

According to an embodiment of the present invention, the toggle-type positioning platform further comprises a ball bearing disposed on the second platform. The ball bearing is disposed between the first platform and the second platform, and contacts with the first platform.

According to an embodiment of the present invention, the first platform has a guide and the ball bearing is suitable for moving along the guide.

As embodied and broadly described herein, the present invention also provides a toggle-type machine tool comprising a first toggle-type positioning platform, a second toggle-type positioning platform and a main axle. The first toggle-type positioning platform comprises a first platform, a first motor, a first screw rod, a second platform and a first linkage. The first motor and the first screw rod are disposed on the first platform. The first motor is coupled to the first screw rod, and is suitable for driving the first screw rod to rotate. The second platform is disposed on the first platform, wherein the second platform is suitable for moving back and forth alternately along a first predetermined path, and a first included angle exists between an extended direction of the first predetermined path and the first screw rod. The first linkage is disposed between the first platform and the second platform, and connected between the second platform and the first screw rod. The first linkage is driven by the rotation of the first screw rod, such that the second platform is driven to move along the first predetermined path. The second toggle-type positioning platform is disposed on the first toggle-type positioning platform, and comprises a second motor, a second screw rod, a third platform and a second linkage. The second motor and the second screw rod are disposed on the second platform. The second motor is coupled to the second screw rod, and is suitable for driving the second screw rod to rotate. The third platform is disposed on the second platform. The third platform is suitable for moving back and forth alternately along a second predetermined path, and a second included angle exists between an extended direction of the second predetermined path and the second screw rod. The second linkage is disposed between the third platform and the second platform, and connected between the third platform and the second screw rod. The second linkage is driven by the rotation of the second screw rod, such that the third platform is driven to move along the second predetermined path, and a third included angle exists between the second predetermined path and the first predetermined path. The main axle is disposed above the third platform, and is suitable for moving back and forth alternately along a path perpendicular to the third platform.

According to an embodiment of the present invention, the first included angle is 90°.

According to an embodiment of the present invention, the second included angle is 90°.

According to an embodiment of the present invention, the third included angle is 90°.

According to an embodiment of the present invention, the first platform has a first guiding groove, and the second platform is suitable for moving along the first guiding groove.

According to an embodiment of the present invention, the first toggle-type positioning platform further comprises a first ball bearing disposed on the second platform. The first the ball bearing is disposed between the first platform and the second platform, and is suitable for moving along the first guiding groove.

According to an embodiment of the present invention, the first toggle-type positioning platform further comprises a first ball bearing disposed on the second platform. The first the ball bearing is disposed between the first platform and the second platform, and contacts with the first platform.

According to an embodiment of the present invention, the first platform has a first guide. The first ball bearing is suitable for moving along the first guide.

According to an embodiment of the present invention, the second platform has a second guiding groove. The third platform is suitable for moving along the second guiding groove.

According to an embodiment of the present invention, the second toggle-type positioning platform further comprises a second ball bearing disposed on the third platform. The second ball bearing is disposed between the third platform and the second platform, and is suitable for moving along the second guiding groove.

According to an embodiment of the present invention, the second toggle-type positioning platform further comprises a second ball bearing disposed on the third platform. The second ball bearing is disposed between the third platform and the second platform, and contacts with the second guiding groove.

According to an embodiment of the present invention, the second platform has a second guide. The second ball bearing is suitable for moving along the second guide.

According to an embodiment of the present invention, the toggle-type machine tool further comprises a third motor, a third screw rod and two third linkages. The third motor and the third screw rod are disposed on the first platform. The third motor is coupled to the third screw rod, and is suitable for driving the third screw rod to rotate. The third linkages are connected between both sides of the main axle and the third screw linkage, respectively. The third linkages are driven by the rotation of the third screw rod, such that the main axle is driven to move back and forth alternately along a path perpendicular to the third platform.

The positioning platform of the present invention mainly features the toggle-type mechanism, such that the positioning precision thereof may be enhanced. Further, the positioning platform of the present invention features a toggle-type mechanism to achieve higher feed precision without using a servo drive system of high precision.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIGS. 3 and 4 are numerical analysis data of the toggle-type positioning platform according to one embodiment of the present invention.

DESCRIPTION OF THE EMBODIMENTS

Figure 1:
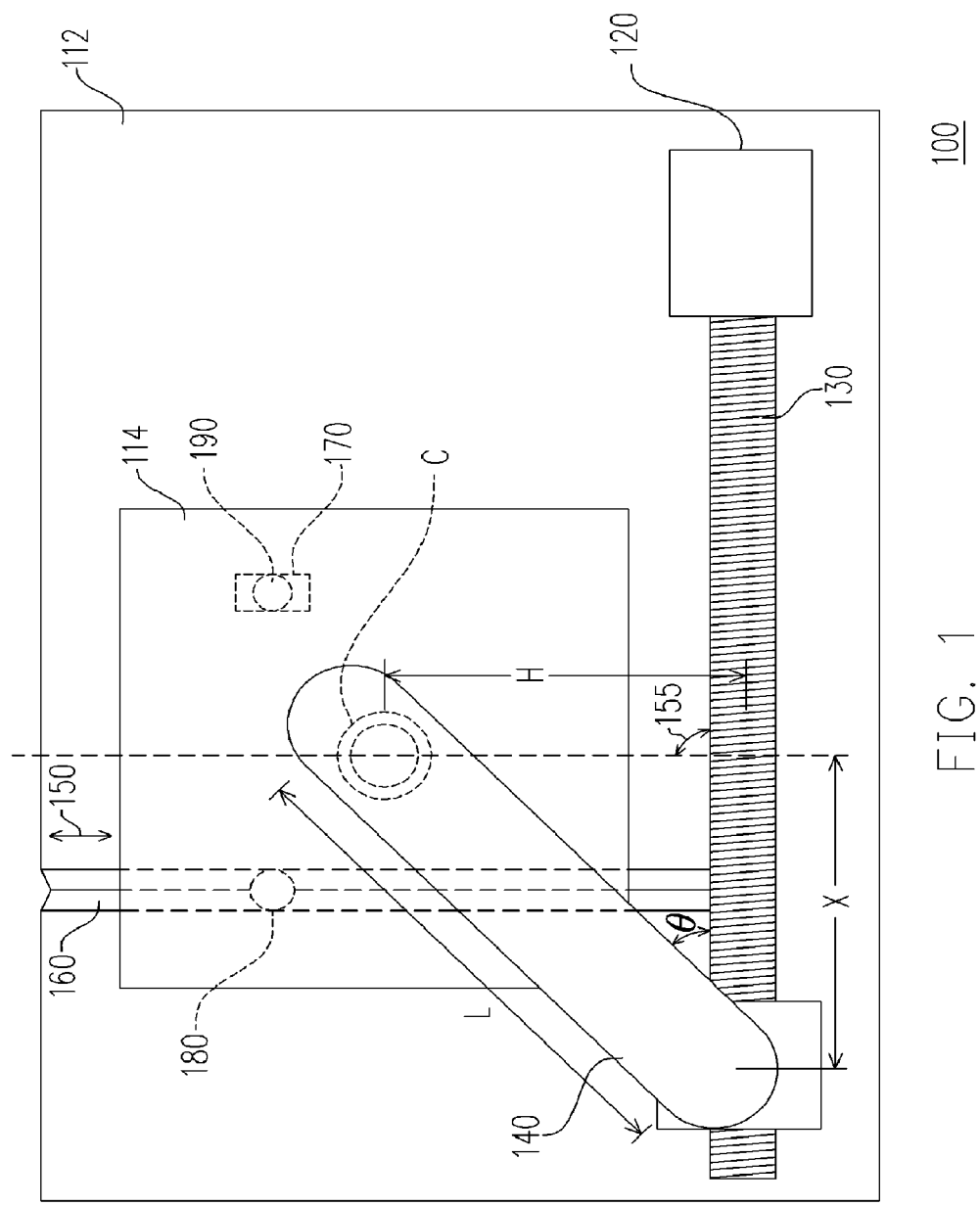
FIG. 1 is a top view showing a toggle-type positioning platform according to one embodiment of the present invention.

Reference will now be made in detail to the present preferred embodiments of the invention, examples of which are illustrated in the accompanying drawings. Wherever possible, the same reference numbers are used in the drawings and the description to refer to the same or like parts.

A toggle-type positioning platform and a toggle-type machine tool of the present invention mainly feature a toggle-type mechanism for positioning to enhance the fabrication precision. The preferred embodiments of the present invention are illustrated in the following, but the present invention is not limited to the embodiments.

Figure 2:
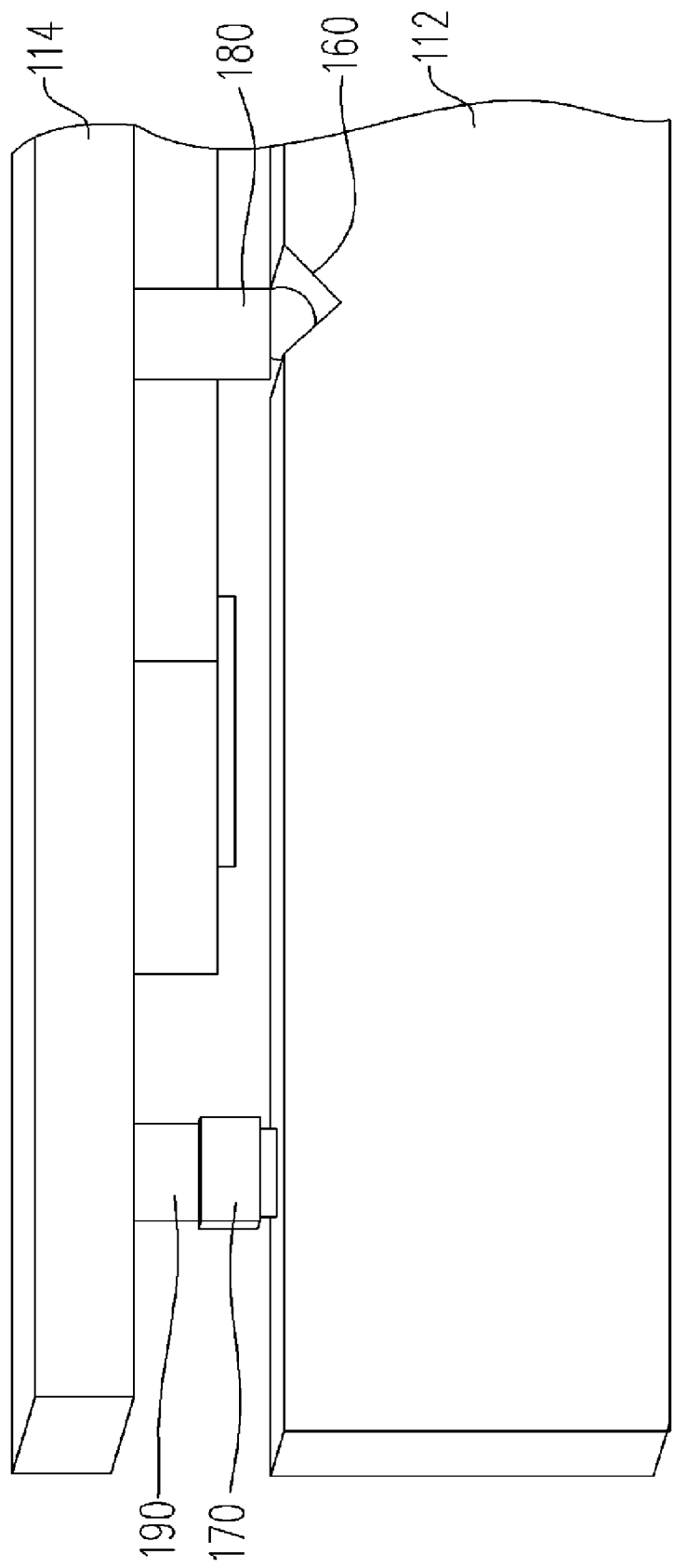
FIG. 2 is a partial side view showing the toggle-type positioning platform according to one embodiment of the present invention.

FIG. 1 is a top view showing a toggle-type positioning platform according to one embodiment of the present invention. FIG. 2 is a partial side view showing the toggle-type positioning platform according to one embodiment of the present invention. Referring to FIGS. 1 and 2, the toggle-type positioning platform 100 comprises a first platform 112, a motor 120, a screw rod 130, a second platform 114 and a linkage 140. The motor 120, the screw rod 130 and the second platform 114 are disposed on the first platform 112. The motor 120 is coupled to the screw rod 130, such that the screw rod 130 is driven by the motor 120. The second platform 114 moves back and forth alternately along a predetermined path 150 on the first platform 112, and an included angle 155 exists between an extended direction of the predetermined path 150 and the screw rod 130. In this embodiment, the included angle 155 is 90°, however, the included angle 155 may be other angles. The linkage 140 is disposed between the first platform 112 and the second platform 114, and is connected between the second platform 114 and the screw rod 130. The connecting portion C defines where the linkage 140 is connected to the second platform 114. The linkage 140 is driven by the rotation of the screw rod 130, such that the second platform 114 is driven to move along the predetermined path 150.

More specifically, the first platform 112 may have a guide groove 160 and the second platform 114 is suitable for moving along the guide groove 160. In this embodiment, the guide groove 160 has a cross-section of V-shape; however, the guide groove 160 may have a cross-section of U-shape or other shapes. Besides, the toggle-type positioning platform 100 may comprises a ball bearing 180. The ball bearing 180 is disposed on the first platform 112 and is between the first platform 112 and the second platform 114, and therefore the second platform 114 may move along the predetermined path 150. In brief, the ball bearing 180 may move along the guide groove 160.

Further, the toggle-type positioning platform 100 may comprise a ball bearing 190 for enhancing the stability of the second platform 114. The ball bearings 190 and 180 are disposed at both sides of the connecting portion C. Additionally, the first platform 112 may has a guide 170, and the ball bearing 190 is suitable for moving along the guide 170. The positioning method of the toggle-type positioning platform 100 of this embodiment is illustrated in following.

FIGS. 3 and 4 are numerical analysis data of the toggle-type positioning platform according to one embodiment of the present invention. Please refer to FIGS. 1, 3 and 4, the displacement X defines the displacement of one end of the linkage 140 on the screw rod 130, the distance H defines the perpendicular distance from the connecting portion C to the screw rod 130, and the ΔH defines the positioning precision. The unit of the displacement X, the distance H is μm.

Since the length L of the linkage 140 and the displacement X are known, therefore the perpendicular distance H from the connecting portion C to the screw rod 130 can be calculated from the geometric relationship. More specifically, when the displacement X is very small, the smaller distance H and higher positioning precision ΔH may be attained. Accordingly, the length of the linkage, the displacement of the screw rod, the included angle between the linkage and the screw rod and other factors may affect the resolution and sensitivity of the displacement of the platform. In other words, the resolution of positioning may be enhanced by increasing the length of the linkage. The toggle-type machine tool utilizing the toggle-type positioning platform is illustrated in following.

Figure 5:
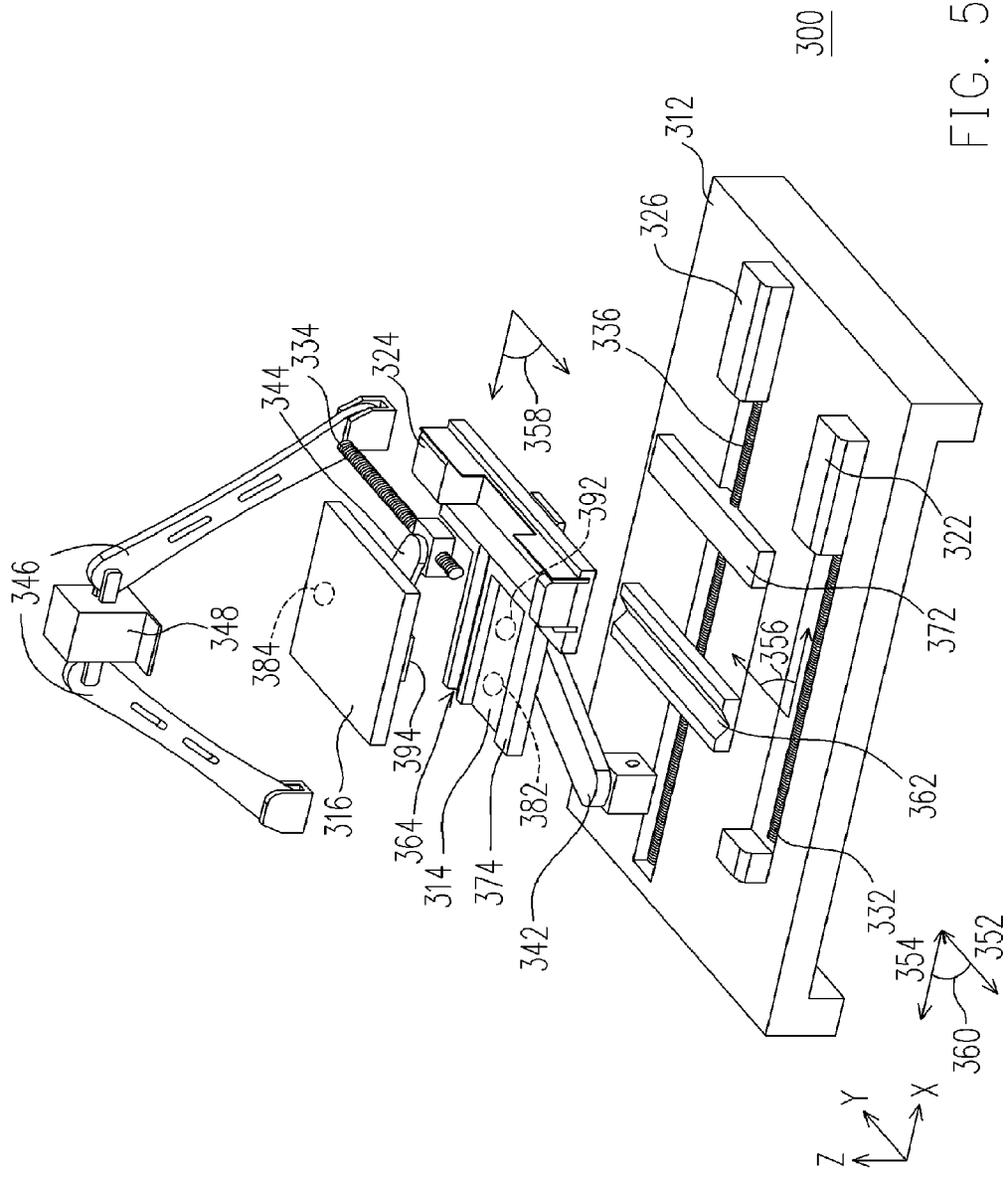
FIG. 5 is an exploded diagram showing a toggle-type machine tool according to one embodiment of the present invention.
Figure 6:
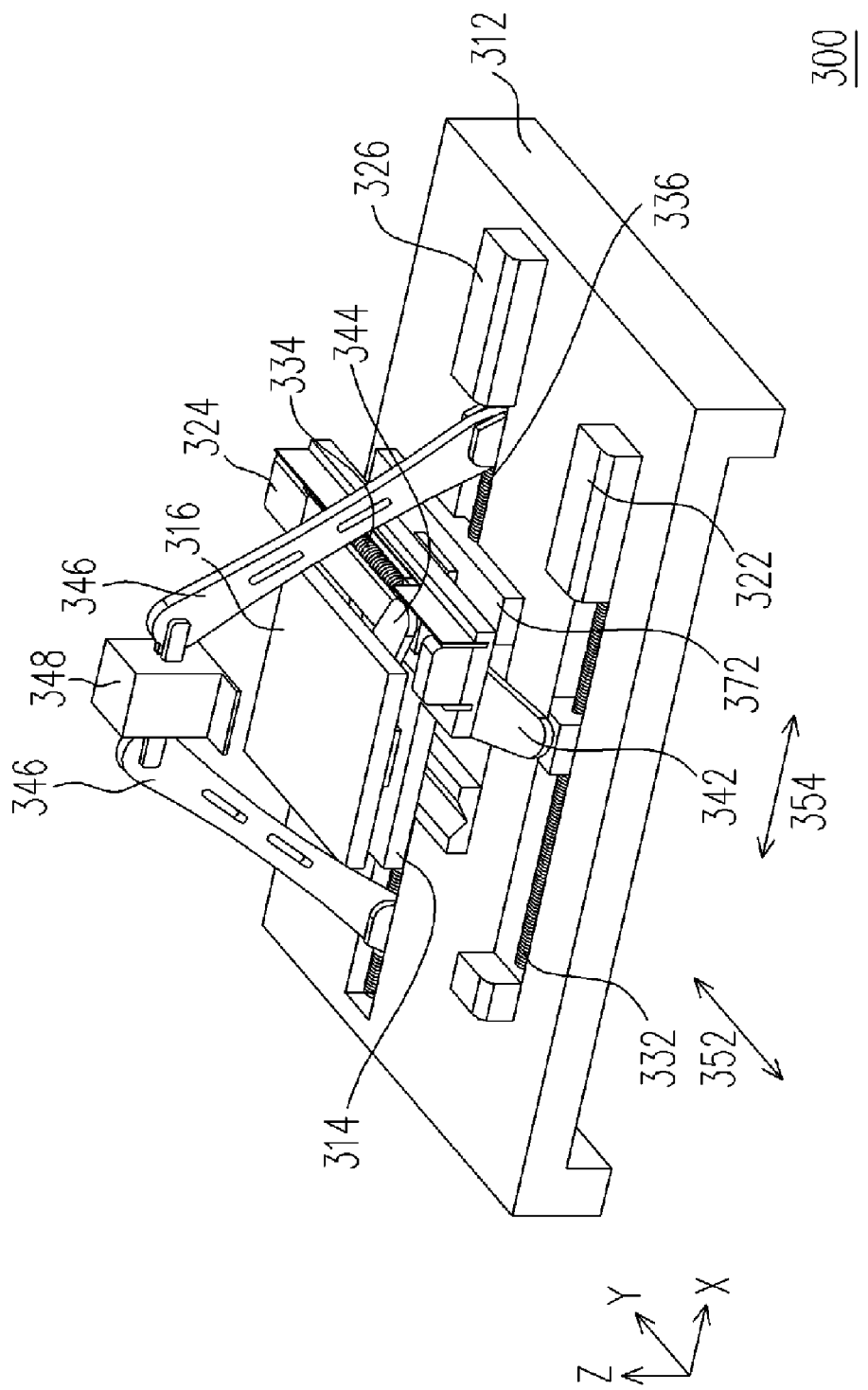
FIG. 6 is a three-dimensional diagram showing a toggle-type machine tool according to one embodiment of the present invention.

FIG. 5 is an exploded diagram showing a toggle-type machine tool according to one embodiment of the present invention. FIG. 6 is a three-dimensional diagram showing a toggle-type machine tool according to one embodiment of the present invention. Referring to FIGS. 5 and 6, the toggle-type machine tool 300 comprises a first toggle-type positioning platform, a second toggle-type positioning platform and a main axle 348. The first toggle-type positioning platform and the second toggle-type positioning platform are similar to the above-mentioned toggle-type positioning platform 100. More specifically, the first toggle-type positioning platform comprises the first platform 312, the first motor 322, the first screw rod 332, the second platform 314 and the first linkage 342; the second toggle-type positioning platform comprises the second platform 314, the second motor 324, the second screw rod 334, the third platform 316 and the second linkage 344.

For the first toggle-type positioning platform, the first motor 322, the first screw rod 332 and the second platform 314 are disposed on the first platform 312. Additionally, the second platform 314 moves back and forth alternately along the first predetermined path 352 on the first platform 312, and a first included angle 356 is formed between the extended direction of the first predetermined path 352 and the first screw rod 332. In this embodiment, the first included angle 356 is 90°, but however the first included angle 356 may be other angle. Furthermore, the first platform 312 may also have a first guide groove 362 and a first guide 372, and the first toggle-type positioning platform may comprise a first ball bearing 382 and a first ball bearing 392. The second platform 314 may move along the first guide groove 362 and the first guide 372 through the first ball bearing 382 and the first ball bearing 392, respectively, such that the second platform 341 may move relative to the first platform 312.

For the second toggle-type positioning platform, the second motor 324, the second screw rod 334 and the third platform 316 are all disposed on the second platform 314. Besides, the third platform 316 may move back and forth alternately along a second predetermined path 354 on the second platform 314, and a second included angle 358 is formed between the extended direction of the second predetermined path 354 and the second screw rod 334. In this embodiment, the second included angle 358 is 90°, but however the second included angle 358 may be other angle. Further, the second platform 314 may have a second guide groove 364 and a second guide 374, and the second toggle-type positioning platform may further comprise a second ball bearing 384 and a second ball bearing 394. The third platform 316 may move along the second guide groove 364 and the second guide 374 through the second ball bearing 384 and the second ball bearing 394, respectively, such that the third platform 316 may move relative to the second platform 314.

Additionally, a third included angle 360 is formed between the second predetermined path 354 and the first predetermined path 352. In this embodiment, the included angle 360 is 90°, but however the included angle 360 may be other angle. Further, the main axle 348 is above the third platform 316 and may move back and forth alternately along a direction perpendicular to the third platform 316.

It should be noted that the positioning method of the above-mentioned toggle-type mechanism may be applied to the main axle 348. For example, the toggle-type machine tool 300 further comprises a third motor 326, a third screw rod 336, and two third linkages 346. The third linkages 346 are connected between both ends of the main axle 348 and both ends of the third screw rod 336, respectively. Additionally, the third linkages 346 are driven by the rotation of the third screw rod 336, and the main axle 348 may move back and forth alternately along the direction perpendicular to the third platform 316 by the movement of the third linkages 346. The positioning method of the toggle-type machine tool 300 is illustrated in following.

First, since the first motor 322 is coupled to the first screw rod 332, therefore, the first linkage 342 moves when the first screw rod 332 is driven by the first motor 322. The first linkage 342 may drive the second platform 314 to move back and forth alternately along the first guide groove 362, which also means the first predetermined path 352. In this embodiment, the direction of the first predetermined path 352 is the Y-axis.

Similarly, since the second motor 324 is coupled to the second screw rod 334, therefore, the second linkage 344 moves when the second screw rod 334 is driven by the first motor 322. The second linkage 344 may drive the third platform 316 to move back and forth alternately along the second platform 314, which also means the second predetermined path 354. In this embodiment, the direction of the second predetermined path 354 is the X-axis.

When the third motor 326 drives the third screw rod 336 to rotate, the included angle between the two third linkages 346 is also changed. More specifically, since the third screw rod 336 has right-hand thread and left-hand thread, one end of the third linkages 346 becomes closer when the third screw rod 336 rotates. In other words, the main axle 348 moves toward positive Z-axis. On the contrary, when the third screw rod 336 rotates reversely, the main axle 348 moves toward negative Z-axis.

In summary, the toggle-type positioning platform and the toggle-type machine tool of the present invention have the following advantages:

1. The toggle-type positioning platform and the toggle-type machine tool of the present invention may attain high precision and high resolution.

2. The positioning platform of the present invention features a toggle-type mechanism to achieve higher feed precision without using a servo drive system of high precision.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A toggle machine tool, comprising:
a first toggle positioning platform, comprising:
   a first platform;
   a first motor, disposed on the first platform;
   a first screw rod, wherein the first screw rod is disposed on the first platform and coupled to the first motor for driving the first screw rod to rotate;
   a second platform, disposed on the first platform, for moving back and forth alternately along a first predetermined path, and a first included angle existing between an extended direction of the first predetermined path and the first screw rod; and
   a first linkage, disposed between the first platform and the second platform, and connected between the second platform and the first screw rod, wherein the first linkage is driven by the rotation of the first screw rod, such that the second platform is driven to move along the first predetermined path;
a second toggle positioning platform, disposed on the first toggle positioning platform, the second toggle positioning platform comprising:
   a second motor, disposed on the second platform;
   a second screw rod, wherein the second screw rod is disposed on the second platform and coupled to the second motor for driving the second screw rod to rotate;
   a third platform, disposed on the second platform, for moving back and forth alternately along a second predetermined path, and a second included angle existing between an extended direction of the second predetermined path and the second screw rod; and
   a second linkage, disposed between the third platform and the second platform, and connected between the third platform and the second screw rod, wherein the second linkage is driven by the rotation of the second screw rod, such that the third platform is driven to move along the second predetermined path, and a third included angle exists between the second predetermined path and the first predetermined path;
   a main axle, disposed above the third platform, wherein the main axle is for moving back and forth alternately along a path perpendicular to the third platform; and
   a third motor, disposed on the first platform;
   a third screw rod, wherein the third screw rod is disposed on the first platform and coupled to the third motor for driving the third screw rod to rotate; and
   two third linkages, connected between both sides of the main axle and the third screw linkage, respectively, wherein the third linkages are driven by the rotation of the third screw rod, such that the main axle is driven to move back and forth alternately along a path perpendicular to the third platform.

2. The toggle machine tool according to claim 1, wherein the first included angle is 90°.

3. The toggle machine tool according to claim 1, wherein the second included angle is 90°.

4. The toggle machine tool according to claim 1, wherein the third included angle is 90°.

5. The toggle machine tool according to claim 1, wherein the first platform has a first guiding groove, and the second platform is for moving along the first guiding groove.

6. The toggle machine tool according to claim 5, wherein the first toggle positioning platform further comprises a first ball bearing disposed on the second platform, wherein the first ball bearing is disposed between the first platform and the second platform, and the first ball bearing is for moving along the first guiding groove.

7. The toggle machine tool according to claim 1, wherein the first toggle positioning platform further comprises a first ball bearing disposed on the second platform, wherein the first ball bearing is disposed between the first platform and the second platform, and contacts with the first platform.

8. The toggle machine tool according to claim 7, wherein the first platform has a first guide, and the first ball bearing is for moving along the first guide.

9. The toggle machine tool according to claim 1, wherein the second platform has a second guiding groove, and the third platform is for moving along the second guiding groove.

10. The toggle machine tool according to claim 9, wherein the second toggle positioning platform further comprises a second ball bearing disposed on the third platform, wherein the second ball bearing is disposed between the third platform and the second platform, and the second ball bearing is for moving along the second guiding groove.

11. The toggle machine tool according to claim 1, wherein the second toggle positioning platform further comprises a second ball bearing disposed on the third platform, wherein the second ball bearing is disposed between the third platform and the second platform, and the second ball bearing contacts with the second guiding groove.

12. The toggle machine tool according to claim 11, wherein the second platform has a second guide, and the second ball bearing is for moving along the second guide.

* * * * *